US006679628B2

(12) United States Patent
Breinlinger

(10) Patent No.: US 6,679,628 B2
(45) Date of Patent: Jan. 20, 2004

(54) SOLID STATE TEMPERATURE MEASURING DEVICE AND METHOD

(75) Inventor: Richard H. Breinlinger, Hampstead, NH (US)

(73) Assignee: Schneider Automation Inc., North Andover, MA (US)

( * ) Notice: Subject to any disclaimer, the term of this patent is extended or adjusted under 35 U.S.C. 154(b) by 0 days.

(21) Appl. No.: 09/929,324

(22) Filed: Aug. 14, 2001

(65) Prior Publication Data

US 2003/0035463 A1 Feb. 20, 2003

(51) Int. Cl.$^7$ .................................................. G01K 7/01
(52) U.S. Cl. ........................................ 374/178; 257/467
(58) Field of Search ............................... 374/778, 763; 702/130, 104, 116, 99; 257/467

(56) References Cited

U.S. PATENT DOCUMENTS

| | | | | |
|---|---|---|---|---|
| 3,812,717 A | * | 5/1974 | Miller et al. ................. | 374/178 |
| 4,004,462 A | * | 1/1977 | Dobkin ........................ | 374/178 |
| 4,126,042 A | | 11/1978 | Lynch | |
| 4,161,880 A | * | 7/1979 | Prosky ........................ | 374/178 |
| 4,228,684 A | * | 10/1980 | Templin ...................... | 374/178 |
| 4,443,117 A | * | 4/1984 | Muramoto et al. ............ | 374/1 |
| 4,475,103 A | | 10/1984 | Brokaw et al. | |
| 4,636,092 A | * | 1/1987 | Hegyi ......................... | 374/178 |
| 4,828,401 A | * | 5/1989 | Sawyer ....................... | 374/178 |
| 5,024,535 A | * | 6/1991 | Winston, Jr. ................ | 374/178 |
| 5,056,048 A | * | 10/1991 | Seperant ..................... | 374/170 |

(List continued on next page.)

FOREIGN PATENT DOCUMENTS

| | | | | |
|---|---|---|---|---|
| EP | 0 360 333 A2 | * | 3/1990 | ................. 374/178 |
| GB | 2 109 938 A | * | 6/1983 | ................. 374/178 |
| GB | 2 191 292 A | * | 12/1987 | ................. 374/178 |
| JP | 57111425 A | * | 7/1982 | ................. 374/163 |
| JP | 58135430 A | * | 8/1983 | ................. 374/171 |
| JP | 03048737 A | * | 3/1991 | ................. 374/163 |
| JP | 2001042906 A | * | 2/2001 | ........... G05B/19/05 |

OTHER PUBLICATIONS

Design Ideas—Transistor Sensor Needs No Compensation.

LM82—Remote Diode and Local Digital Temperature Sensor with Two–Wire Interface.

LM83—Triple–Diode Input and Local Digital Temperature Sensor with Two–Wire Interface.

LM84—Dode Input Digital Temperature Sensor with Two–Wire Interface.

LM34/LM35—Precision Monolithic Temperature Sensors.

*Primary Examiner*—Christopher W. Fulton
*Assistant Examiner*—Mirellys Jagan
(74) *Attorney, Agent, or Firm*—Michael J. Femal; Larry I. Golden

(57) ABSTRACT

A method and system for automated temperature measurement is described. The system includes a programmable logic controller, a temperature measurement diode, an analog-to-digital converter coupled to the diode and the programmable logic controller, a current source coupled to the diode and configured to generate a first current and a second current different from said first current, and a processor coupled to the current source and to the analog-to-digital converter. The processor controls the current source such that the current source sequentially applies the first current to the diode at a first point in time and applies the second current to the diode at a second point in time. The processor also receives a first voltage across the diode measured when the first current is applied to the diode and a second voltage across the diode measured when the second current is applied to the diode. Based on the first and second voltages, the processor determines the temperature proximate the diode.

20 Claims, 6 Drawing Sheets

U.S. PATENT DOCUMENTS

| | | | |
|---|---|---|---|
| 5,149,199 A * | 9/1992 | Kinoshita et al. | 374/178 |
| 5,195,827 A * | 3/1993 | Audy et al. | 374/178 |
| 5,419,637 A * | 5/1995 | Frye et al. | 374/178 |
| 5,453,682 A * | 9/1995 | Hinrichs et al. | 374/171 |
| 5,611,624 A | 3/1997 | Tornare | |
| 5,651,903 A * | 7/1997 | Shirk | 219/121.64 |
| 5,655,305 A | 8/1997 | Fletcher | |
| 5,764,246 A * | 6/1998 | Wataya et al. | 374/178 |
| 5,887,978 A | 3/1999 | Lunghofer et al. | |
| 5,914,629 A * | 6/1999 | Maki | 374/178 |
| 5,918,982 A * | 7/1999 | Nagata et al. | 374/178 |
| 5,961,215 A * | 10/1999 | Lee et al. | 374/178 |
| 5,982,221 A * | 11/1999 | Tuthill | 374/178 |
| 6,019,508 A * | 2/2000 | Lien | 374/178 |
| 6,097,239 A * | 8/2000 | Miranda, Jr. et al. | 374/178 |
| 6,140,860 A * | 10/2000 | Sandhu et al. | 374/178 |
| 6,453,218 B1 * | 9/2002 | Vergis | 374/178 |
| 6,480,127 B1 * | 11/2002 | Aslan | 374/178 |
| 6,554,469 B1 * | 4/2003 | Thomson et al. | 374/178 |
| 2002/0080938 A1 * | 6/2002 | Alexander, III et al. | 379/106.01 |

* cited by examiner

SOLID STATE TEMPERATURE MEASURING DEVICE AND METHOD

FIELD OF THE INVENTION

The present invention relates to a device and a method for measuring temperature, and more particularly to a device and method for digitally measuring an analog voltage, proportional to temperature.

BACKGROUND OF THE INVENTION

Numerous methods exist to measure temperature by using electronic devices such as semiconductors and resistors. Semiconductor devices used vary from a simple, low cost diode to a pair of transistors, specially manufactured for high accuracy of temperature measurement. Other devices use resistors of varying stability to support a highly accurate and easily calibrated temperature measuring device. The resistors are placed in a Wheatstone bridge configuration. A Wheatstone bridge is a common technique wherein a probe, typically a thermistor, causes the bridge to become unbalanced as the temperature changes. The temperature changes sensed by the probe cause the bridge to transmit an analog signal.

Temperature measurement is critical to many applications. Typically, a thermocouple device is insert into a liquid, gas, or in contact with a surface. As the thermocouple senses a temperature change in its environment, the thermocouple circuit creates an analog signal. As opposed to a digital signal, or a series of zeros and ones that represent the state of an object, the analog signal is continuously variable with temperature. However, every analog signal must be converted to a digital signal for use by a computer system, such as a programmable logic controller (PLC) system.

A PLC control system has numerous inputs acting as conditions that a PLC acts upon. Based upon the input temperature, the control system may cause an alarm to sound, or slow the reaction rate through a reduction in a catalyst. It is the critical nature of temperature measurement across numerous applications that result in a wide variety of measuring devices.

A widely used temperature measurement device 100 in FIG. 1A uses a simple, low cost diode in which a constant current $I_A$ is applied from a current source. Every diode 104 has a junction voltage with varies with temperature. This voltage shift with temperature is called the slope of the diode, (S). The voltage 106 across the diode is proportional to the temperature of the junction represented by the equation T~=K–S/degree Celsius. The slope S and the constant K are measured in millivolts. In addition, each diode junction voltage 108 or slope has an error term as the diode heats up because of the constant current source 102.

Other devices use a resistor circuit to adjust the slope of the diodes in the circuit. These resistor circuits are used to compensate for the cold junction temperature of the thermocouple. The cold junction or reference temperature is the analog output of the thermocouple circuit at zero degrees Celsius. A thermocouple device produces an analog output proportional to the measured temperature. Compensating for the cold junction temperature improves the accuracy of the thermocouple device. The analog-to-digital converter reads the voltage difference between the measured temperature and the cold junction temperature. A fixed cold junction signal produces an accurate and repeatable base signal to the analog-to-digital converter. A similar system is described in U.S. Pat. No. 4,441,071, which is incorporated herein by reference. In another system, amplifiers and a power supply are added to the resistor network to compensate for the cold junction temperature. A similar system is described in U.S. Pat. No. 4,126,042, which is incorporated herein by reference.

Other devices use a combination of resistors and amplifiers to measure a voltage change, hence, a temperature change over a predefined range. Typically, these systems are used for measuring high temperatures requiring a highly accurate result. The temperature represented by the output signal is low to moderate requiring the use of amplifiers. A similar system is described in U.S. Pat. No. 5,611,624, which is incorporated herein by reference.

Yet in other devices, the resistor not the diode provides the analog signal based upon the sensed temperature change. The resistors are configured in a Wheatstone bridge circuit with a power source applied across the circuit. A first circuit called a reference circuit provides a first signal that is constant to the analog-to-digital converter. A second circuit called a bridge circuit provides a second signal, the second signal's output is proportional to the temperature change, to the analog-to-digital converter. The comparison of the two separate signals allows the use of inexpensive resistors in the circuit to achieve a highly accurate temperature measurement. A similar system is described in U.S. Pat. No. 5,655,305, which is incorporated herein by reference.

FIG. 1B shows a specially manufactured transistor circuit 150 for measuring temperature. This circuit 150 improves measuring accuracy at a much greater cost than the single diode device 100 of FIG. 1A. A pair of transistors 158 and 160, having a known base-emitter junction area ratio are inputs to a differential amplifier 166. A voltage 152 is applied across the transistors 158, 160 and a pair of resistors 154, 156 to draw currents 162 and 164 through the transistors. The ratio of the base-emitter current density of the transistor pair 158 and 160 yields a known slope. the error term of the junction voltage at the base emitter cancels out when the current density or surface area of each transistor is controlled at the time of manufacture.

The voltage change due to the measured temperature causes the currents 162 and 164 to flow through the transistor pair 158, 160, which amplify the small voltage change. The amplified voltage across the transistor pair 158, 160 is the input to a differential amplifier 166, having an output proportional to the absolute temperature measured (PTAT). One of the transistors 158, 160 in the transistor pair is the cold junction or reference temperature circuit. A similar system is described in the National Semiconductor LM34, LM82, LM83, and LM84 specifications, which are incorporated herein by reference. A similar system is described in U.S. Pat. No. 4,475,103, which is incorporated herein by reference.

Although some devices use a diode or a group of diodes, each temperature device design trades cost for accuracy and temperature range. The temperature device of FIG. 1A has the advantage of low cost and an output signal capable of being measured without additional circuitry. Additional circuitry increases manufacturing cost, thus, an increased cost to the end product. Moreover, additional circuitry increases cost because of engineering and design considerations in the product using the more complicated circuit.

The diode circuit of FIG. 1A has many disadvantages shared by other low cost circuits. The temperature range and accuracy depends upon the diode type and details of its manufacture. The design engineer using the device of FIG. 1A must have engineering information on the diode itself.

Regardless of the diode, the circuit of FIG. 1A has an inherently low accuracy and requires calibration before use. Calibration fixes the use of the FIG. 1A circuit, thus, limiting its reuse in other applications. Last, the higher the temperature measured the lower the voltage output from the circuit. This would require additional circuitry thus leading to an increased cost.

The cold junction or reference temperature circuit used in thermocouple based devices of other devices leads to additional cost and engineering complexity. Without a cold junction temperature, the actual measurement has no baseline. Additional circuitry provides a cold junction analog signal as an input to the circuitry of the temperature measuring device. The additional circuitry narrows the use of the temperature measuring devices. The narrowed use results from a need to improve accuracy and reduce the calibration time. Electronic circuits lose accuracy because of the heat generated from current used to power the circuit itself. To compensate for lost accuracy, the circuit designers tend to use more expensive electronic components and design for narrower temperature ranges. Designing for narrower temperature ranges allows one to apply the electronic circuit accurately to the narrower range, resulting in a higher resolution much like microscope at high power. The additional circuitry has more stable resistors, power amplifiers, and specially manufactured transistors.

The circuit of FIG. 1B uses a pair of transistors. This circuit has a much higher cost, almost sixty times the circuit of FIG. 1A because of the engineering and manufacturing in the diodes contained in the transistors and the circuit supporting the matched diode pair. Like the diodes of FIG. 1A, the user must know the diode type and the details of its manufacture.

The temperature circuit of FIG. 1B has better accuracy than FIG. 1A and a wider temperature range than FIG. 1A. However, the circuit of FIG. 1B requires careful matching of the diodes used in base emitter of transistors 158 and 160 at manufacture. In addition, more circuitry is required to measure the analog signal proportional to the temperature measured.

SUMMARY OF THE INVENTION

The present invention provides a method and system for automated temperature measurement. The system, on which the method is based, includes a programmable logic controller, a temperature measurement diode, an analog-to-digital converter coupled to the diode and the programmable logic controller, a current source coupled to the diode and configured to generate a first current and a second current different from said first current, and a processor coupled to the current source and to the analog-to-digital converter. The processor controls the current source such that the current source sequentially applies the first current to the diode at a first point in time and applies the second current to the diode at a second point in time. The processor also receives a digital representation of a first voltage across the diode measured when the first current is applied to the diode and a second digital representation of a voltage across the diode measured when the second current is applied to the diode. Based on these digital representations of the first and second voltages, the processor determines the temperature proximate the diode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
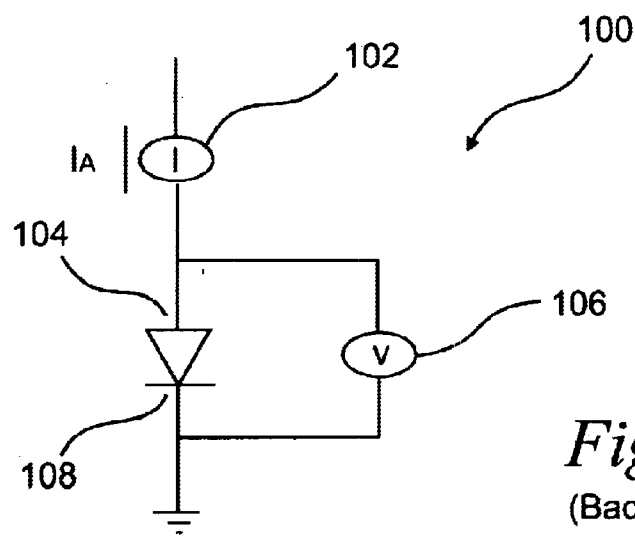
FIG. 1A is an illustration of a single diode circuit having a constant current and a measurement of a voltage proportional to the temperature of the system controlled.
Figure 1B:
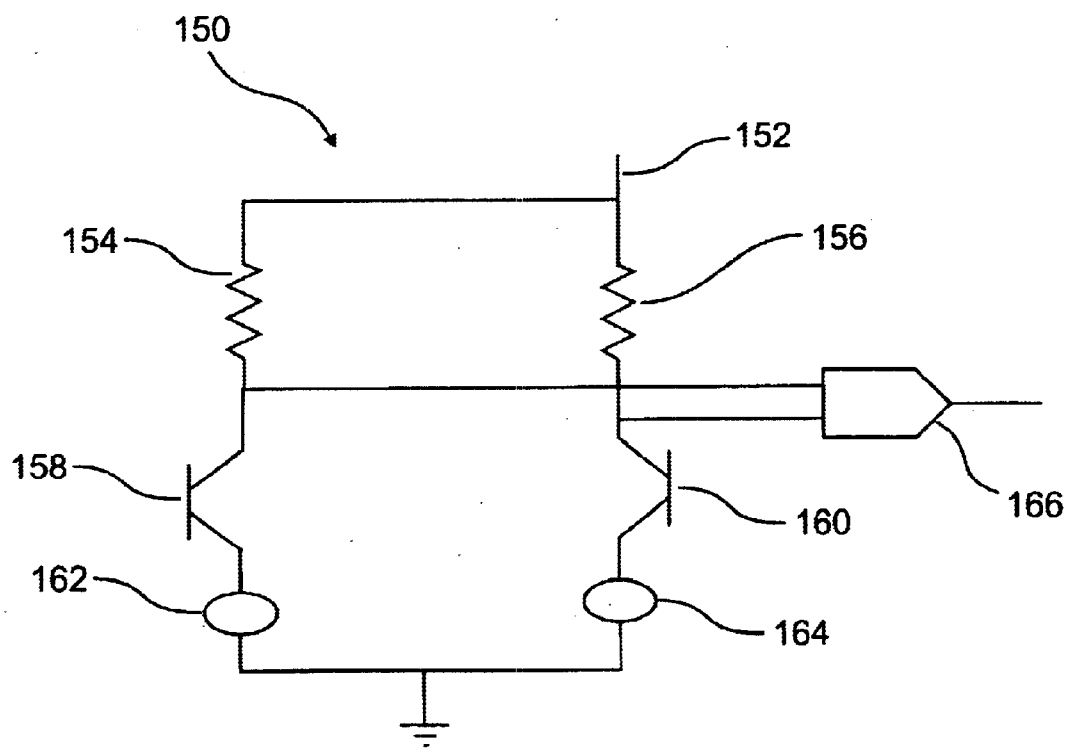
FIG. 1B is an illustration of a dual transistor circuit having constant current source passed through a pair of matched transistors with a known ratio between transistor junction areas.
Figure 2A:
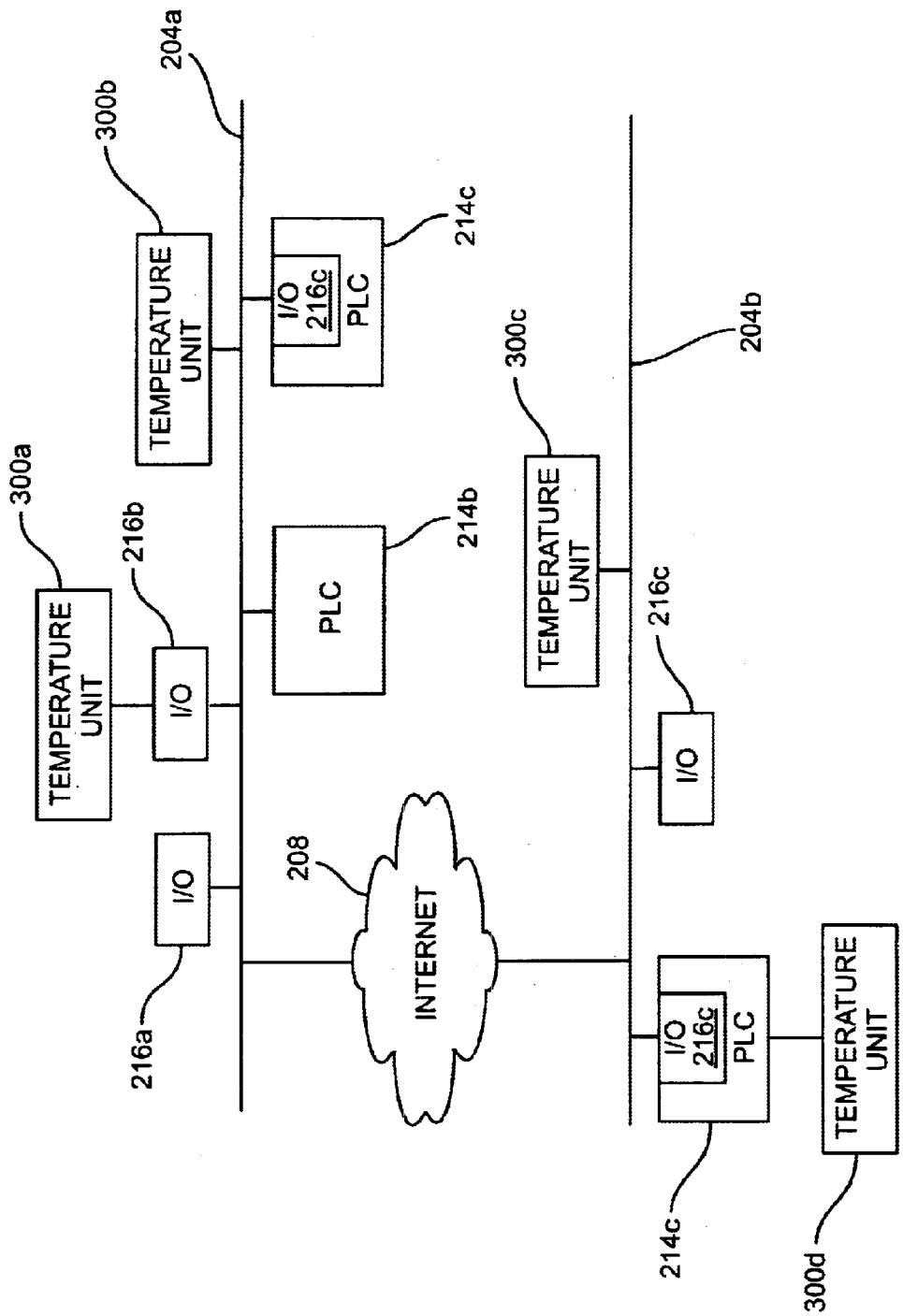
FIG. 2A is an exemplary system employing several variations of the temperature measurement device of the present invention.

Referring now to the drawings, wherein like reference numerals designate identical or corresponding parts throughout the several views, and more particularly to FIG. 2A thereof, there is shown a conceptual diagram of an exemplary programmable logic controller (PLC) system of the present invention. PLC 214*a*, temperature units 300*c* and 300*d*, and I/O module 216*e* communicate over network 204*b*, and PLC 214*b*, 214*c*, I/O modules 216*a* and 216*b*, and temperature units 300*a* and 300*b* communicate over network 204*a*.

Networks 204*a* and 204*b* may be Ethernet networks or any other suitable bus, LAN, backplane or other hardware and/or software that permits various devices to communicate. Networks 204*a* and 204*b* may form all or part of a larger network, such as the Internet 208, which enables components of network 204*a* to communicate with components of network 204*b*.

PLCs 214*a*, 214*b*, 214*c* are programmable and may or may not include I/O modules 216 configured according to the present invention. For example, PLC 214*b* has no I/O module, whereas PLCs 214*a* and 214*c* include I/O modules 216*d* and 216*c*, respectively. Typically, PLCs are used in factory automation to control various factory processes, such as temperature measurement.

I/O modules 216*a*, 216*b*, 216*c*, 216*d*, and 216*e* are hardware for sending and receiving data. In particular, the I/O modules 216 of FIG. 2A deliver commands to the temperature units 300*a*, 300*b*, and 300*c* to cause the temperature units 300 to measure temperature. The I/O modules 216 also receive temperature measurement information from the temperature units 300. I/O modules 216 may be implemented as cards that are inserted into a PLC (such as I/O modules 216*c* and 216*d*) or as hardware that is connected to the same backplane or network as the PLCs 214 and the temperature units 300.

The temperature units or measuring devices 300*a*, 300*b*, 300*c*, and 300*d* measure the temperature of any surface to which they are thermally coupled. The temperature units 300 may be connected to one or more of the PLCs 214 in the system in any number of ways. For example, temperature unit 300a is connected directly to I/O device 216b, temperature units 300b and 300c are connected directly to networks 204a and 204b, respectively, and temperature unit 300d is connected directly to PLC 214a (e.g., via the I/O module 216d). The temperature units 300 communicate status information and temperature measurements to one or more of the PLCs 214 via I/O modules 216.

Figure 2B:
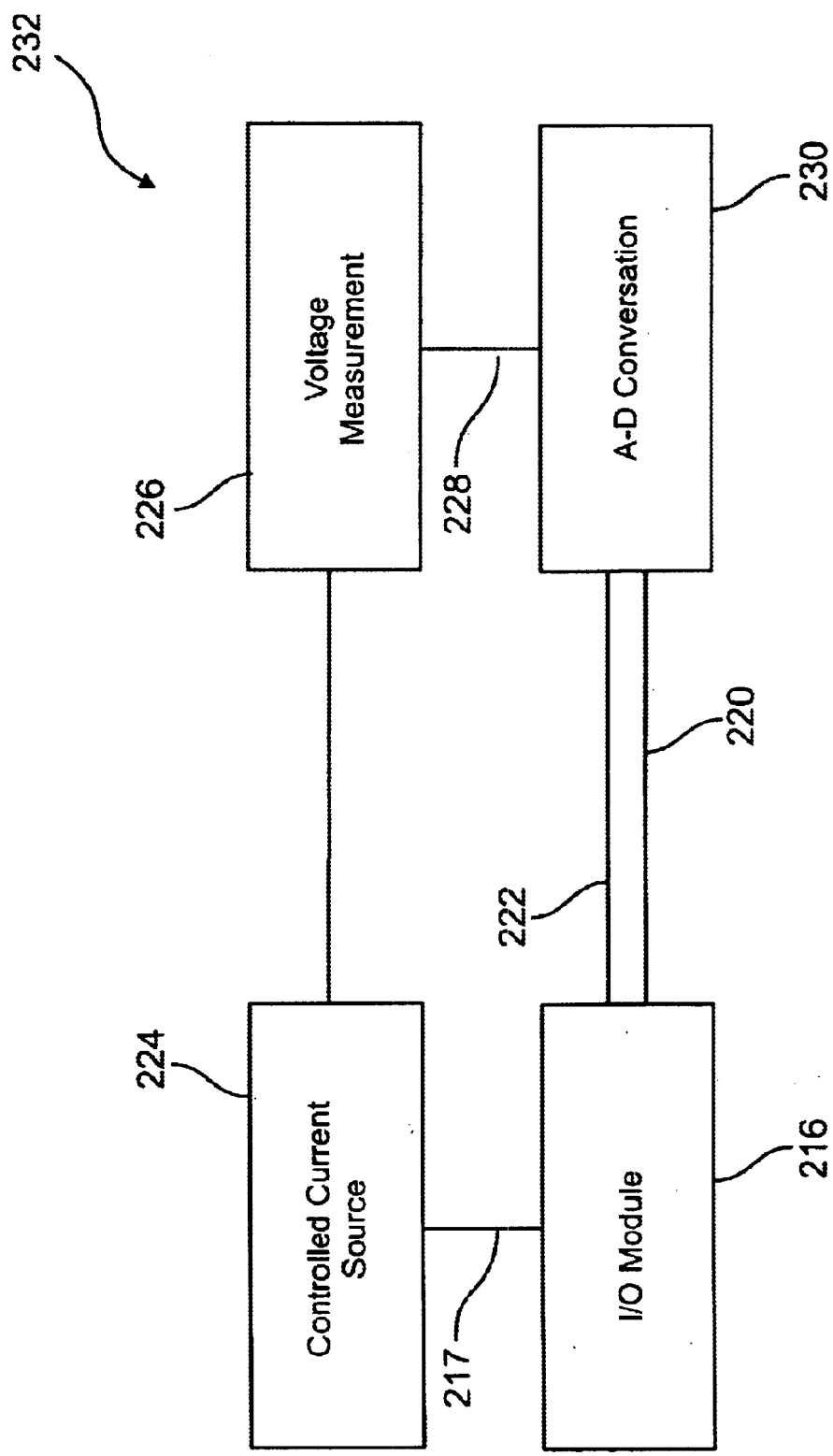
FIG. 2B is a conceptual illustration of the temperature measurement device of one embodiment of the present invention.

FIG. 2B conceptually shows how temperature measurements are made according to one embodiment of the invention. A PLC 214 sends a command to a temperature unit 300 to begin calibration and/or temperature measurement. These commands can be sent over network 204, over the Internet 218, directly (e.g., PLC 214a sends a command directly to I/O module 216d), and/or via an I/O module. For example, PLC 214a may send a command to temperature unit 300a via the Internet 208, and I/O module 216b.

In FIG. 2B commands 217 from PLC 214 are relayed by I/O module 216 to a controlled current source 224 coupled to, or forming a part of, temperature unit 300. For example, I/O card 216d within PLC 214a signals controlled current source 224 associated with temperature unit 300b). Command 217 causes the controlled current source 224 to apply a first current to temperature unit 300. A voltage measurement 226 takes place in the temperature unit 300, resulting in an analog signal 228 that represents the voltage. Analog-to-digital (A/D) conversion 230 converts the analog signal 228 into a digital signal representative of the voltage. This digital signal is stored in temperature unit 300. Shortly after the first command 217, PLC 214 sends a read command 220 via I/O module 216 to read the digital voltage measurement stored in an A/D converter of the temperature unit 300. After the read command 220, the A/D converter writes the converted voltage measurement 226 to a digital signal 222 to the PLC 214.

Once the PLC 214 retains a valid measure, a second command 217 instructs the controlled current source 224 to change the current by a fixed multiple of the original current. Preferably, the current source 224 changes the current by a fixed integral amount. Then the process repeats itself by performing a voltage measurement 226, A/D conversion 230, and sending a second digitized voltage measurement to PLC 214.

Once the two digital voltage values are read by PLC 214, PLC 214 calculates the temperature using the following equation $\Delta V_{BE}=V_{BE1}-V_{BE2}=\eta kT/q \ln(J_{E1}/J_{E2})$. $V_{BE1}$ is the first voltage measurement and $V_{BE2}$ is the second voltage measurement. K is the Boltzman constant and q is the charge on the election. Both K and q are known and fixed. In this embodiment, one diode is used for both measurements, thus the ratio of the current densities of the diodes $J_{E1}/J_{E2}$ is equal to the ratio of currents $I_1$ and $I_2$ and the correction term $\eta=1$. In an alternative embodiment with two diodes, it is necessary to account for the fact that no two diodes are manufactured alike (thus $J_{E1}$ mah not equal $J_{E2}$ for a given current density) and each diode has inaccuracies. These factors are compensated for by a predetermined constant $\eta$.

Figure 3A:
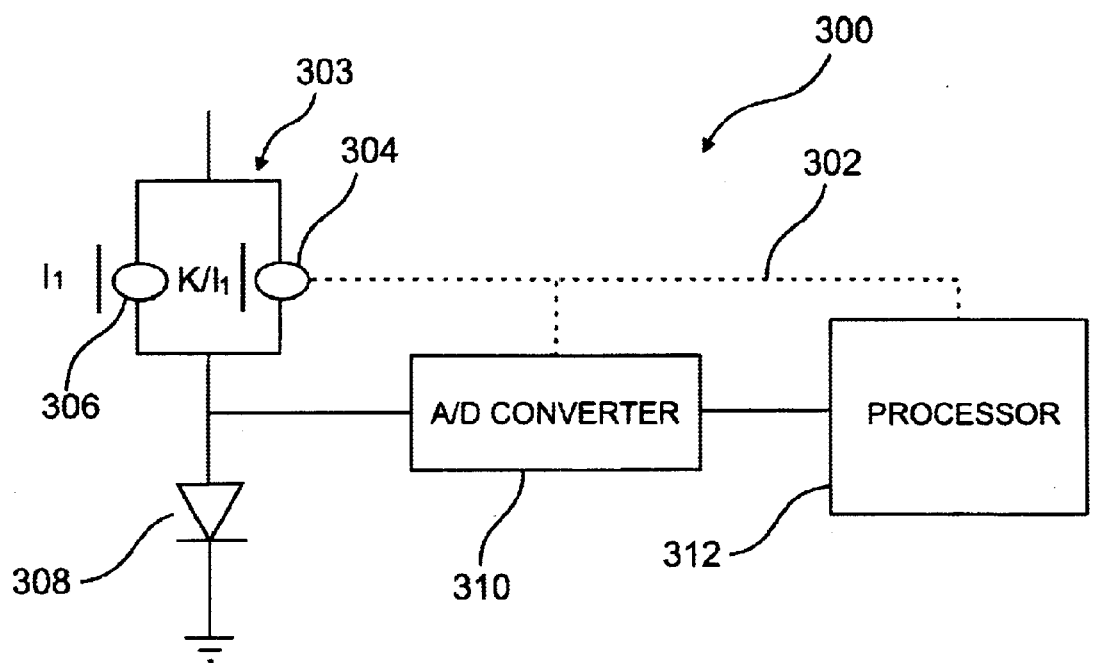
FIG. 3A is a schematic illustration of one embodiment of the temperature measurement device of the present invention.

FIG. 3A is a schematic diagram of a solid state temperature unit or measuring device 300, according to an embodiment of the invention. Control signals 302 control the operation of a power supply 303 and an analog-to-digital converter 310 (shown by dashed lines).

Processor 312 is any controller, CPU, circuit, or logic device for sending control signals 302 to power source 303 and A/D converter 310. The processor 312 generates control signals to cause the power supply 303 to generate currents that are applied to a diode 308. A/D converter 310 reads the analog diode voltage as currents are applied to the diode 308 from the power supply 303. The analog-to-digital converter 310 converts the analog diode voltages to digital form and sends the digital voltages to the processor 312, which uses the diode voltages to determined the temperature of a surface onto which the diode 308 is mounted. The processor 312 generates control signals 302 to control when the analog-to-digital converter 310 reads the diode voltages and sends the digitized diode voltages to the processor 312. It is to be understood that processor 312 does not form a portion of the temperature unit 300 in some embodiments. In those embodiments, the processor 312 is located in PLC 214 or any other suitable device in communication with the temperature unit 300. In other embodiments, processor 312 forms a portion of, and is integral with, temperature unit 300.

Power supply 303 may be either a single current source for providing different currents to the diode 308. If power supply 303 supplied to different currents to the diode 308 at different times, then the power supply 303 may be conceptually represented by two current sources 304 and 306, as shown in FIG. 3. However, power supply 303 may also be implemented as two separate current sources, which alternately supply a current to the diode 308 under the control of the control signals 302 received from the processor 312. The diode 308 is preferably a semiconductor diode but may be any other device over which voltage measurements may be taken to derive temperature. The analog-to-digital converter 310 is preferably a 16-bit high precision analog-to-digital converter. However, any other type of analog-to-digital converter may be used, depending on the degree of precision desired in the measurement of the voltage across the diode 308.

The processor 312 is any commercially available central processing unit for controlling the application of currents by the power source 303 and the read in and read out of voltages by the analog-to-digital converter. Additionally, the processor 312 uses the digitized voltages received from the analog-to-digital converter 310 to calculate the temperature of the surface onto which the diode 308 is mounted. It is to be understood that any processor or multiple processors may be used to perform the functionality of the processor 312. For example, a micro controller or a simple timing and arithmetic unit may be used in place of the processor 312. Further, part of the functionality of the processor 312 may be divided over one or more local processors and one or more processors that are remote from the diode 308. For example, the timing of the current supplied from the power supply 303 and the reading and output of voltages by the analog-to-digital converter 310 may be controlled by a processor remotely located in a PLC system and/or across a local area network (LAN) or wide area network (WAN), such as the Internet 218.

Figure 3B:
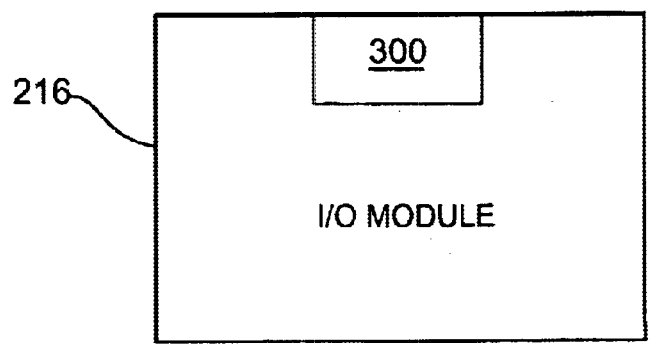
FIG. 3B is an illustration of an I/O module employing the temperature measurement device of the present invention.
Figure 4:
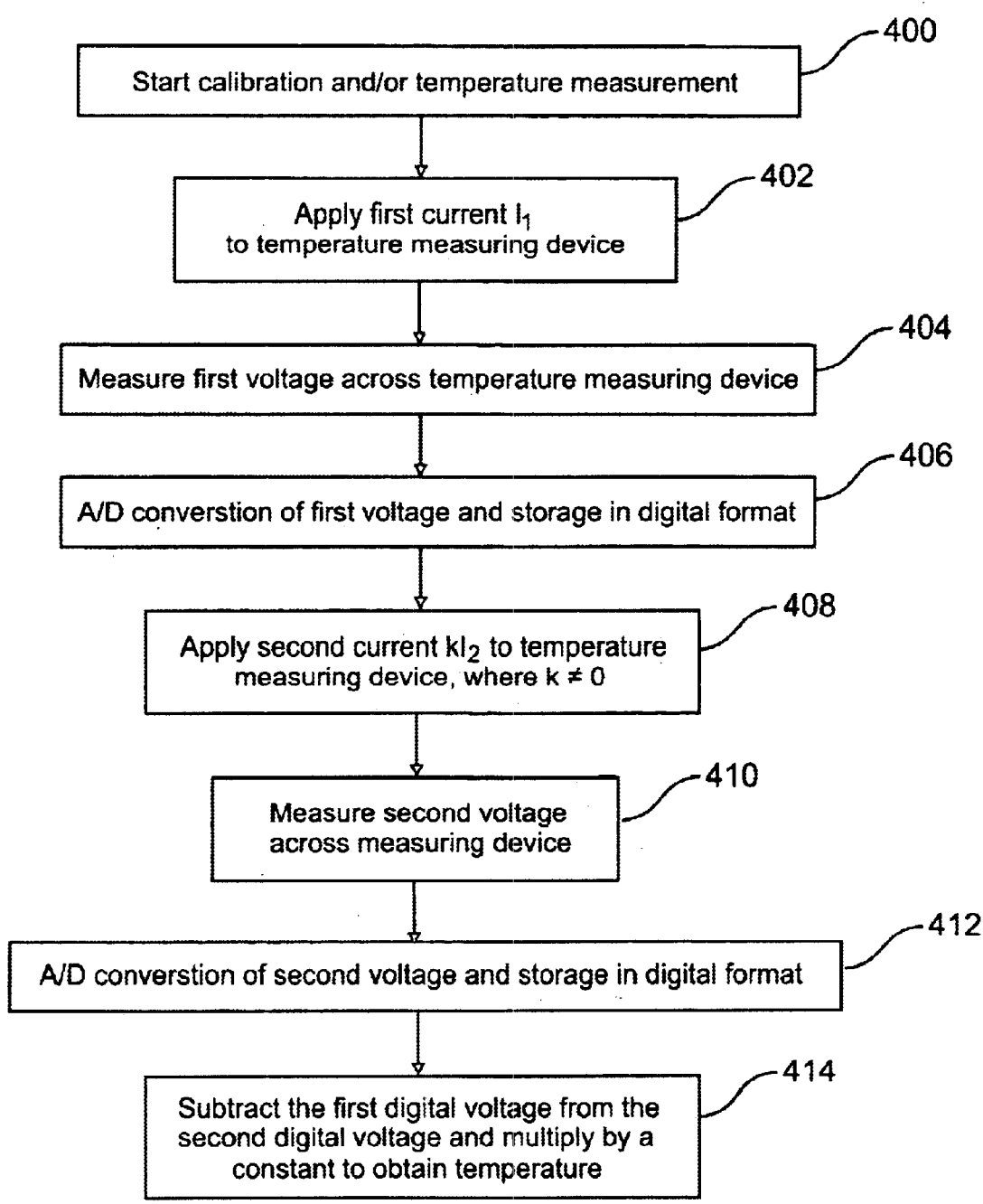
FIG. 4 is a flowchart explaining how the present invention measures the temperature measuring device in accordance with an embodiment of the present invention.
Figure 5:
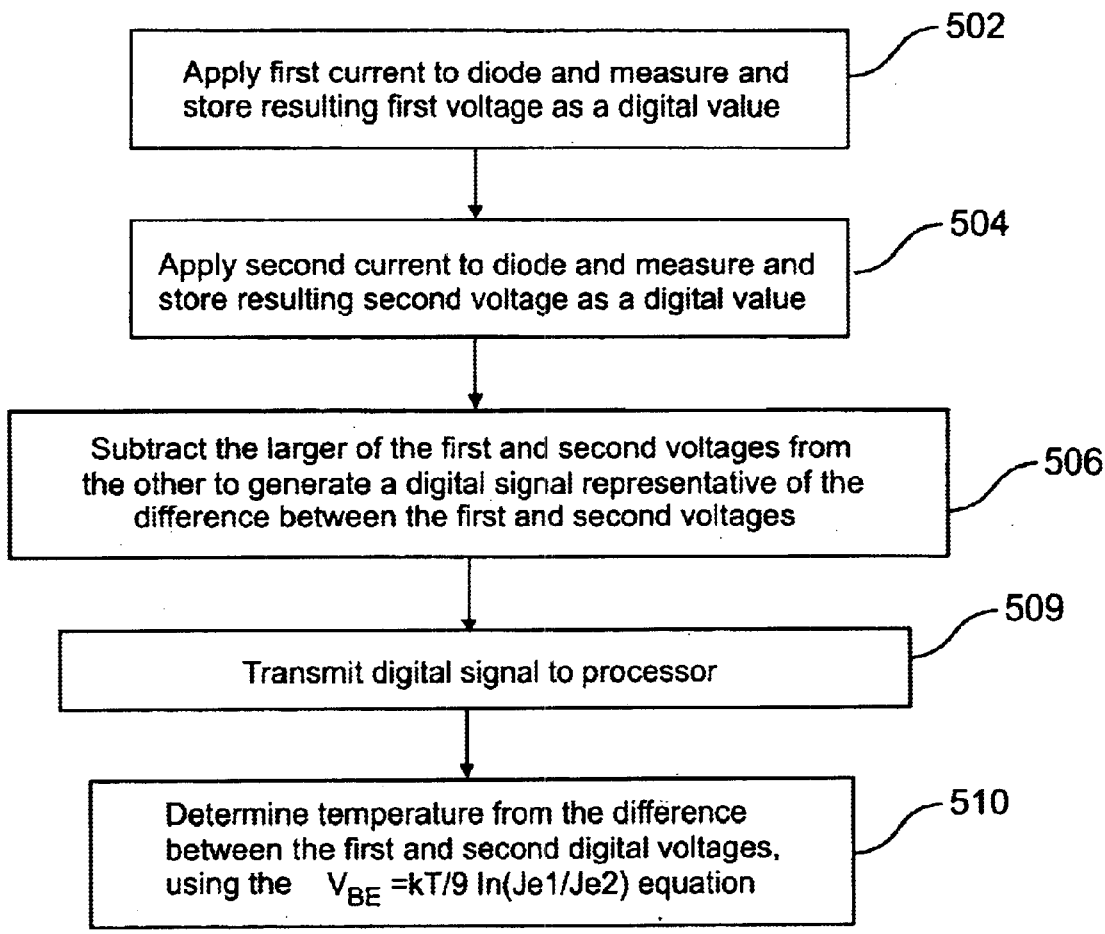
FIG. 5 is a flowchart explaining how the present invention measures temperature, according to one embodiment.

FIG. 3B is a schematic illustration of an I/O module 216 with an integrated temperature unit 300. Thus, in FIG. 2A, any of the I/O modules 216 may include temperature units 300. However, it is not necessary that the I/O modules 216 include temperature units 300 as any of the I/O modules may be connected to one or more temperature units 300 directly or via a network. The present invention includes the processes and functions performed by the processor 312. FIGS. 4 and 5 are flowcharts for explaining the operation of the temperature unit 300, processor 312, power supply 303, analog-to-digital converter 310, and other components of the system shown in FIG. 2A. In step 400, the processor 312 initiates or receives a command to start calibration of the temperature unit 300. In step 402, the processor 312 outputs a control signal 302, causing power supply 303 to apply a first current 306 to the diode 308. Alternatively, the power supply 303 supplies the first current 306 to the diode 308 in a default mode so that no control from the processor 312 is required in order for the first current $I_1$ to be applied.

In step 404 the processor 312 sends a control signal 302 to the analog-to-digital converter 310, causing the analog-to-digital converter 310 to measure the voltage drop across the diode 308 at a point in time while the first current is supplied to the diode 308. Alternatively, logic circuitry may be used to cause the analog-to-digital converter to periodically measure the voltage across the diode 308 whenever the first current is supplied to the diode 308 by the power supply 303. In this embodiment as well as others, it may be advantageous to integrate the processor 312 and the A/D converter 310.

In step 406 the analog-to-digital converter 310 converts the measured analog voltage to digital format and the digitized result is stored in memory, such as a register or cache in the analog-to-digital converter 310 or the processor 312. Alternatively, the digitized voltage measurement may be stored in a random access memory (RAM) coupled to the processor 312 or may be stored in a cache or register of the processor 312. Once the digitized voltage measurement is stored, the analog-to-digital converter sends to the processor 312 a signal indicating that the first voltage measurement has been taken and digitized.

In step 408 the processor 312 generates a control signal 302 causing the power supply 303 to apply a second current, different from the first current, to the diode 308. Preferably, the first current and the second current are fixed and known, and the second current is a multiple, n, of the first current. For example, the multiple n may be equal to ½, ⅓, ¼, 2, or 3. The generation of the second current may be controlled in alternate ways, as explained above with respect to the first current.

In step 410 the processor 312 sends a control signal 302 to the analog-to-digital converter 310, causing the analog-to-digital converter to measure the diode voltage or voltage drop across the diode 308 at a point in time while second current is applied to the diode 308. Voltage measurement in step 410 may be performed in alternate ways as described above with respect to step 404.

Upon completion of the second voltage measurement, in step 412 the analog-to-digital converter 310 converts the measured analog voltage to digital format and the digitized result is stored in memory. Once the second digital voltage measurement is stored, the analog-to-digital converter 310 sends to the processor 312 a signal indicating that the second voltage measurement has been taken and digitized. A/D conversion and storage may be performed in alternate ways, including those described above with respect to step 406.

In step 414 the processor 312 reads the first and second voltages out of the analog-to-digital converter and calculates the temperature of the surface to which the diode 308 is mounted, using the Ideal Diode Equation. This step provides the differential voltage proportional-to-absolute temperature (PTAT).

FIG. 5 is a flowchart explaining in greater detail how the present invention determines the temperature of the surface or body to which the diode 308 is mounted and/or proximate, based on the Ideal Diode Equation. Temperature measurement is nearly identical conceptually to temperature calibration, so the processes described with respect to FIGS. 4 and 5 are largely interchangeable. In this particular embodiment, the A/D converter 310 includes circuitry for measuring and storing voltage measurements as well as for subtracting the first voltage and the second voltage.

In step 502 the processor 312 causes the current source to apply the first current to the diode 308 and causes the A/D converter 310 to measure and store the voltage across the diode 308. In step 504 the processor 312 causes the current source to apply the second current to the diode 308 and causes the A/D converter 310 to measure and store the voltage across the diode 308. In step 506 the processor 312 subtracts the digital representation of the voltage resulting from the higher current from the digital representation of the voltage resulting from the lower current. Thus, if the second current is greater than the first current, then the first current, then the first voltages is substrated from the second voltage.

Then, in step 509 the digitized difference in the voltages is transmitted to the processor 312. In step 510, the temperature of the mass or body proximate the diode is determined by the processor by multiplying the difference between the voltages by a constant, derived from the previously described equation $\Delta V_{BE}=V_{BE1}-V_{BE2}=\eta kT/q \ln(J_{E1}/J_{E2})$. For the single diode embodiment $\eta=1$ and the constant is the inverse ratio of the Boltzman constant, k, and the charge on the electron, q. The resulting product is the temperature of the surface to which the diode 308 is mounted in degrees Kelvin. Optionally, an additional scaling function can be used to convert degrees Kelvin to another temperature scale (e.g., Fahrenheit or Celsius).

The temperature calculated in step 510 is output to different devices, depending on the particular use of the temperature unit 300. For example, in one embodiment the temperature is supplied to a thermocouple module and the temperature supplies the cold junction reference used to measure temperature at a remote end of the thermocouple. In other embodiments, the temperature may be sent to PLC 214 or other factory automation control device, such as a monitor or a memory that includes a database of temperature measurements over time.

As explained above, the temperature system and method of the present invention has a single diode having a first end operably connected to a pair of current sources, and having a second end connect to ground. The single diode or transistor junction is in thermal communication with a heat conducting surface. At the start-up of a system in which the device resides, a microprocessor starts the calibration cycle. The microprocessor turns on the current sources. This starts a first current to flow through the diode circuit. Shortly thereafter, the microprocessor signals an analog-to-digital converter to read the voltage drop across the diode. The analog-to-digital converter reads the voltage and converts the analog signal to a digital signal. The microprocessor reads the digital signal and stores the value in a first temporary memory.

Next, the microprocessor via a control circuit changes to a second current. Shortly, thereafter the microprocessor signals an analog-to-digital converter to read the voltage drop across the diode. The analog-to-digital converter reads the voltage and converts the analog signal to a digital signal. The microprocessor reads the digital signal and stores the value in a second temporary memory. The microprocessor via the control circuit maintains a constant ratio between the two current flows. Maintaining a known ratio of currents, the common terms cancel out leaving only the actual variables to be measured.

Having the analog voltage signal of both current flows converted to a digital value, the microprocessor determines the temperature of the diode circuit. Using the previously described equation and a known ratio of currents, the microprocessor can determine the actual temperature measured can be determined during operation of a PLC system.

The present invention removes the inherent diode error terms. The error term cancels out when the same diode is used. Moreover, an inexpensive diode can be used rather than a specially manufactured transistor and its associated circuitry. In typical PLC system, the system already contains a microprocessor, the PLC itself. Also, an analog-to-digital converter resides in a typical PLC system to convert other analog signals to digital signals for use by the microprocessor.

Additionally, embodiments of the present invention are able measure temperature over a wide range with an accuracy of + or −1 degree Celsius accuracy at room temperature. The device is simple to recalibrate, if needed, and can be reused. The present invention does not require complicated circuitry or expensive components. The device needs a current control circuit and diode, as the microprocessor and analog-to-digital converter already exists in a typically PLC system. The device is compact and small. The device can be placed most anywhere on a thermal surface in the PLC system. Last, the control circuit can be integrated into the control logic of the PLC itself. The PLC system having the microprocessor can interrupt or make contact with the control circuit at anytime during its program logic to measure the actual temperature. The diode circuit during operation is constantly transmitting an output voltage proportional to the temperature. The constant output signal is an input into the analog-to-digital converter. The PLC instructs the control circuit to read the input signal, convert and transfer into a first temporary PLC memory location the temperature measured. Moreover, the PLC system can be programmed to recalibrate based on a counter that performs the calibration, as described above, after a preset number of actual temperature measurements. This automatic recalibrate ensures accurate temperature measurement for critical applications. In addition, the PLC can store the calibration data and temperature readings for historical and quality control reporting purposes.

Obviously, numerous modifications and variations of the present invention are possible in light of the above teachings. It is therefore to be understood that within the scope of the appended claims, the invention may be practiced otherwise than as specifically described herein.

I claim:

1. A system for automated temperature measurement, comprising:
    a temperature measurement diode;
    a programmable logic controller;
    a current source;
    means for controlling the current source such that the current source sequentially applies a first current to the diode at a first point in time and applies a second current to the diode at a second point in time, said means for controlling the current source being coupled to the programmable logic controller and the current source;
    means for measuring a first analog voltage across the diode when the first current is applied to the diode and for measuring a second analog voltage across the diode when the second current is applied to the diode;
    means for sequentially digitizing the first and second analog voltage measurements with an integrated circuit; and
    means for determining the temperature proximate the diode based on the first and second digitized voltage measurements.

2. The system of claim 1, wherein the programmable logic controller is configured to host the means for controlling the current source and the means for determining the temperature.

3. The system of claim 2, wherein the programmable logic controller comprises an I/O module coupled to the current source.

4. The system of claim 1, wherein the means for controlling the current source and the means for determining the temperature are external to the programmable logic controller.

5. The system of claim 4, wherein the system further comprises:
    an I/O module external to the programmable logic controller and configured to couple the programmable logic controller to the current source.

6. The system of claim 5, wherein the I/O module is configured to host the means for determining the temperature.

7. A system for automated temperature measurement, comprising:
    a programmable logic controller;
    a temperature measurement diode;
    an integrated circuit coupled to the diode and the programmable logic controller and comprising an analog-to-digital converter configured to sequentially digitize analog voltage signals provided by the diode;
    a current source coupled to the diode and configured to generate a first current and a second current different from said first current; and
    a processor coupled to the current source and to the analog-to-digital converter, configured to control the current source such that the current source sequentially applies the first current to the diode at a first point in time and applies the second current to the diode at a second point in time, to obtain a digital measure of a first voltage across the diode from the analog-to-digital converter when the first current is applied to the diode and to obtain a digital measure of a second voltage across the diode from the analog-to-digital converter when the second current is applied to the diode, and determine the temperature proximate the diode based on the first and second digital measures.

8. The system of claim 7, wherein the diode comprises:
    a first end forming a collector; and
    means for connecting said first end to the current source and to said analog-to-digital converter.

9. The system of claim 7, wherein the diode comprises:
    a second end forming a base emitter; and
    means for connecting the second end to a ground.

10. The system of claim 7, wherein said second current is a fixed ratio of said first current.

11. The system of claim 7, wherein the analog-to-digital converter is configured to receive the first voltage and the second voltage, configured to convert the first voltage and the second voltage from analog measurements to digital measurements of the first and second voltage, and configured to transmit the digital measurements of the first voltage and the second voltage to the processor.

12. The system of claim 7, wherein said current source comprises a first current source configured to generate the first current and a second current source configured to generate the second current.

13. The system of claim 7, further comprising:

an I/O module external to the programmable logic controller and configured host the A/D converter and the current source.

14. The system of claim 7, wherein said processor unit is contained within the programmable logic controller.

15. The system of claim 14, wherein the programmable logic controller comprises an I/O module coupled to the A/D converter and to the current source.

16. The system of claim 7, further comprising:

an I/O module external to the programmable logic controller and configured to couple the programmable logic controller to the A/D converter and to the current source.

17. The system of claim 16, wherein the processor unit is contained within the I/O module.

18. The system of claim 7, further comprising:

a temperature unit configured to host the diode, the A/D converter, and the current source.

19. The system of claim 18, wherein the processor unit is contained within the temperature unit.

20. A method for automated temperature measurement in a system comprising a programmable logic controller, a temperature measurement diode, an analog-to-digital converter coupled to the diode and the programmable logic controller, and a current source coupled to the diode, comprising:

controlling the current source such that the current source sequentially applies a first current to the diode at a first point in time and applies a second current to the diode at a second point in time;

measuring a first analog voltage across the diode when the first current is applied to the diode measuring a second analog voltage across the diode when the second current is applied to the diode;

sequentially digitizing the first and second analog voltage measurements in an integrated circuit comprising an analog-to-digital converter; and determining the temperature proximate the diode based on the first and second digitized voltages measurements.

* * * * *